United States Patent [19]

Mifuji et al.

[11] Patent Number: 4,590,762
[45] Date of Patent: May 27, 1986

[54] SECONDARY AIR SUPPLY DEVICE FOR AN INTERNAL COMBUSTION ENGINE EXHAUST SYSTEM

[75] Inventors: Ken Mifuji, Aichi; Norio Shibata, Toyota, both of Japan

[73] Assignees: Nippon Soken, Inc., Nishio; Toyota Jidosha Kabushiki Kaisha, Toyota, both of Japan

[21] Appl. No.: 629,496

[22] Filed: Jul. 10, 1984

[30] Foreign Application Priority Data

Jul. 12, 1983 [JP] Japan .................. 58-127433

[51] Int. Cl.⁴ .............................................. F01N 3/30
[52] U.S. Cl. ........................................................ 60/293
[58] Field of Search ......................................... 60/293

[56] References Cited

U.S. PATENT DOCUMENTS 2,854,816 10/1958 Bodine .................................. 60/293
4,149,378 4/1979 Nakamura ............................. 60/293
4,433,541 2/1984 Amano .................................. 60/293

Primary Examiner—Douglas Hart
Attorney, Agent, or Firm—Cushman, Darby & Cushman

[57] ABSTRACT

A secondary air supply device for introducing, by utilizing the exhaust gas pulsations, a flow of secondary air into the exhaust gas to after-burn the unburned combustibles comprises a secondary air supply conduit including an inlet section having a reduced flow area and an exit section having an enlarged flow area. This enables an increase of the frequency of resonance of the secondary air supply conduit without reducing the length thereof, so that the amplitude of the pressure pulsation in the secondary air supply conduit is extended to cause the pressure pulsation to occur at least in part in the negative pressure range at a high engine speed, thereby assuring the supply of secondary air even during the high speed operating condition of the engine.

1 Claim, 4 Drawing Figures

SECONDARY AIR SUPPLY DEVICE FOR AN INTERNAL COMBUSTION ENGINE EXHAUST SYSTEM

BACKGROUND OF THE INVENTION (1) Field of the Invention

The present invention relates to a secondary air supply device which can be connected to an exhaust pipe of an internal combustion engine to introduce or add fresh air into the exhaust gas to after-burn the unburned combustibles in the exhaust gas.

(2) Description of the Prior Art

It is well known in the art to add a secondary air into the stream of exhaust gas flowing through an exhaust pipe of an internal combustion engine in an attempt to reduce exhaust emissions. Oxygen in the secondary air reacts with hot exhaust gas to convert unburned combustibles such as HC and CO into harmless gases. Introduction of the secondary air is achieved by means of a secondary air supply system including a supply conduit connected at one end to the exhaust pipe. The inlet end of the supply conduit is generally connected to an air cleaner of the combustible mixture supply system of the enginr. A check valve such as a reed valve is placed in the supply conduit. The exhaust gas pressure at the juncture of the supply conduit with the exhaust pipe varies cyclically between a positive and a negative pressure in respones to the opening of the exhaust valve. Note, the term positive pressure as used herein is defined as a pressure higher than ambient pressure, and the term negative pressure is defined as a pressure lower than abmient pressure. The pressure variation at the juncture, in turn, causes pressure pulsations in the air in the secondary air supply conduit. As the pressure in the supply conduit pulsates, the secondary air is drawn through the secondary air supply conduit into the exhaust pipe during the negative pressure period. During the positive pressure period, the check valve prevents backflow of the exhaust gas out of the inlet end of the secondary air supply conduit.

Where the inlet end of the secondary air supply conduit is to be connected to the air cleaner, the supply conduit must have a considerable length. In other instances, it is desirable to locate the inlet end of the supply conduit at a cool air region remote from the exhaust pipe, in order to protect the reed valve from the heat issuing from the engine. In both cases, the requirement is for increasing the length of the secondary air supply conduit.

The frequency of resonance f of the secondary air supply conduit and the length l thereof have a correlation expressed by the equation $$\frac{1}{\tan \frac{2\pi f l}{c}} = 0,$$

wherein c is the velocity of sound. Thus, the frequency of resonance of the supply conduit decreases as the length increases. This results in the exhaust gas pressure pulsating only in the positive pressure range when the engine is rotating at a higher speed, whereby the secondary air supply system fails to permit the fresh air to flow into the exhaust pipe.

SUMMARY OF THE INVENTION

It is, therefore, the object of the present invention to provide a secondary air supply system capable of supplying a sufficient amount of secondary air even in the high speed operating condition of the engine, while keeping the advantages of the long supply conduit.

According to the invention, this is achieved by the provision of a secondary air supply conduit having a flow cross-sectional area at the exit end larger than the flow cross-sectional area at the inlet end, whereby the frequency of resonance of the supply conduit is increased without reducing the length thereof.

DESCRIPTION OF THE PREFERRED EMBODIMENTS

Figure 1:
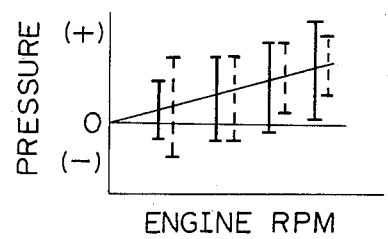
FIG. 1 is a graph showing the amplitude of pressure pulsations at various engine speeds in the prior art secondary air supply conduit.

The problem encountered in the prior art secondary air supply device will be first discussed in more detail with reference to FIG. 1. The amplitude of the pressure fluctuations in two different prior art supply conduits has been measured with respect to four engine speeds and the results are shown in the graph of FIG. 1. In the graph, the solid lines represent the amplitude of pressure pulsation in a relatively shorter supply conduit, and the broken lines represent that in a relatively longer one. The inclined narrow line indicates the average pressure. As will be apparent from the graph, the pressure pulsation in the prior art secondary air supply conduit occurs only in the positive pressure range as the engine speed increases, so that it becomes impossible to introduce the secondary air into the exhaust gas at increased engine speed conditions.

Figure 2:
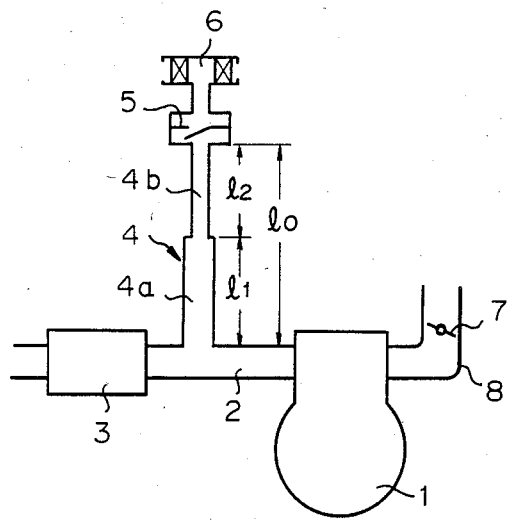
FIG. 2 is a schematic representation of an internal combustion engine provided with the secondary air supply device according to the present invention.

FIG. 2 shows an internal combustion engine having the secondary air supply device according to the present invention. Connected to the engine 1 is an air intake pipe 8 provided with a throttle valve 7 for controlling the flow rate of intake air flowing therethrough. Fresh air is drawn into the engine 1 through the intake pipe 8. The engine 1 is also provided with an exhaust pipe 2 for discharging the exhaust gas formed by combustion of the air and fuel mixture. At the mid point of the exhaust pipe 2 there is connected an end of a secondary air supply conduit 4 for introducing the secondary air into the exhaust gas in the exhaust pipe 2. Downstream of the supply conduit 4, the exhaust pipe 2 is provided with a catalytic converter 3 containing oxidation catalyst which helps the oxidation reaction of the unburned exhaust components with the fresh air introduced from the secondary air supply conduit 4.

At the inlet end of the supply conduit 4 there is provided a reed valve 5 serving as a check valve for preventing the backflow of the exhaust gas from the exhaust pipe 2 through the supply conduit 4. The reed valve 5 is connected to an air cleaner 6 serving to remove foreign materials from the air drawn into the exhaust pipe 2 through the secondary air supply conduit 4.

As the accelerator pedal (not shown) is pressed down, the throttle valve 7 linked thereto is gradually opened to permit a stream of fresh air to flow through the intake pipe 8. This air is mixed with a fuel to form a combustible mixture which is drawn into the engine cylinders. The combustible mixture is burned in the engine 1 to form an exhaust gas which is discharged into the atmosphere through the exhaust pipe 2. During discharge, the exhaust gas in the exhaust pipe undergoes pressure pulsations varying between the negative and positive pressures. During the period of negative pressure, a stream of fresh air is drawn from the air cleaner 6 through the reed valve 5 and the secondary air supply conduit 4 into the exhaust pipe 2 and is added to the exhaust gas. As the exhaust gas flowing through the exhaust pipe 2 is at an elevated temperature, oxygen in the secondary air reacts with the exhaust gas assisted by the oxidation catalyst 3. In this manner, the exhaust gas is purified by oxidation before being discharged into the atmosphere.

As shown in FIG. 2, the diameter of the supply conduit 4 is not uniform along the length thereof. The supply conduit 4 is of a stepped structure and has a larger diameter section 4a located adjacent to the exhaust pipe 2 and a smaller diameter section 4b located at the side of the air cleaner 6.

The frequencies of resonance of the conventional secondary air supply conduit and of the supply conduit according to the present invention may be determined as follows. In the conventional conduit structure having a uniform diameter, the value of the frequency of resonance f satisfies the equation $$\frac{1}{\tan\frac{2\pi fl}{c}} = 0$$

so that the frequency of resonance f decreases as the length l increases. Assuming the total length of the supply conduit according to the invention to be $l_0$, the length of the larger diameter section 4a to be $l_1$, the flow area thereof to be $S_1$, the length of the smaller diameter section 4b to be $l_2$, and the flow area thereof to be $S_2$, the frequency of resonance of the supply conduit of the stepped structure according to the present invention is obtained by solving the following equation $$\frac{\cos kfl_1 \cdot \cos kfl_2 - (S_2/S_1) \cdot \sin kfl_1 \cdot \sin kfl_2}{\sin kfl_1 \cdot \cos kfl_2 + (S_2/S_1) \cdot \cos kfl_1 \sin kfl_2} = 0$$

wherein k represents $2\pi/c$ and c is the velocity of sound.

Figure 3:
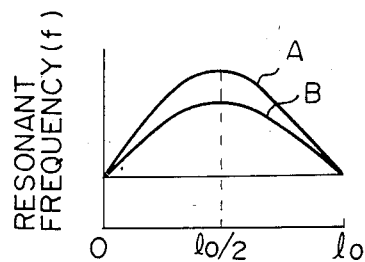
FIG. 3 is a graph showing the variation of the frequency of resonance of the secondary air supply conduit as the length of the larger diameter section of the supply conduit varies.

In FIG. 3, there is shown the variation of the frequency of resonance f as the length $l_1$ of the larger diameter section is increased from zero to $l_0$. In the graph of FIG. 3, curve A indicates the variation of the frequency of resonance f of a supply conduit having a flow area ratio $S_1/S_2$ larger than that of another supply conduit of which the variation of the frequency of resonance f is shown by the curve B. The curves A and B indicate that for a given length $l_1$, the frequency of resonance f becomes higher as the ratio $S_1/S_2$ becomes larger. From FIG. 3, it will be noted that the frequency of resonance f of the secondary air supply conduit increases as the length $l_1$ of the larger diameter section 4a increases from zero. The maximum frequency of resonance f is attained with the length $l_1$ being one half of the total length $l_0$. Therefore, with the conduit structure according to the invention, the frequency of resonance f of the secondary air supply conduit is increased without reducing the length thereof. Thus, although during the high speed length thereof. Thus, although during the high speed operation of the engine the number of exhaust pulses per unit time is increased, causing the frequency of exhaust gas pulsation in the exhaust pipe to be correspondingly increased, the pressure pulsation of the secondary air supply conduit 4 takes place within an extended amplitude of pressure pulsation because the air supply conduit has an increased frequency of resonance f. As a result, the secondary air supply conduit has increased opportunity to be subjected to negative pressure, thereby increasing the flow rate of the secondary air flowing through the supply conduit 4.

Figure 4:
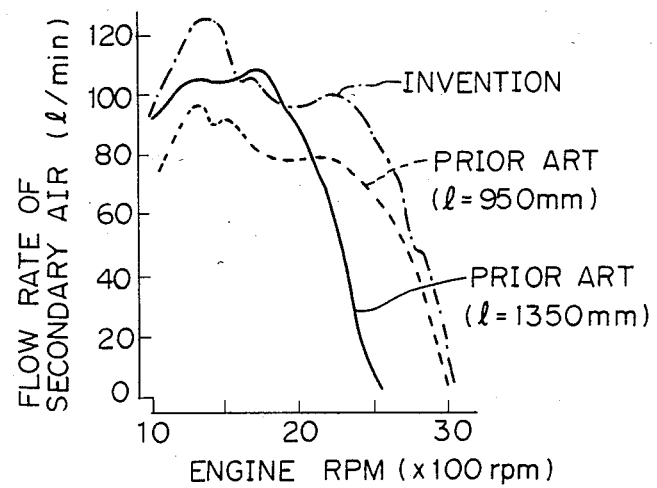
FIG. 4 is a graph showing the flow rate of secondary air at various engine speeds and measured with respect to the secondary air supply device according to the present invention and to two prior devices.

FIG. 4 illustrates the flow rate of the secondary air at varying engine speeds. In the graph of FIG. 4, the solid line indicates the flow rate of the secondary air flowing through a conventional uniform-diameter secondary air supply conduit having a length of 1,350 mm, and a diameter 25 mm. The broken line indicates the flow rate through another conventional uniform-diameter conduit having a length of 950 mm and a diameter of 25 mm. The chain line shows the flow rate through the secondary air supply conduit of the invention comprising a larger diameter section 4a of 650 mm in length $l_1$ and 25 mm in diameter and a smaller diameter section 4b of 700 mm in length $l_2$ and 15 mm in diameter. It will be noted that in one conventional supply conduit the frequency of resonance f is increased by reducing the conduit length, thereby ensuring the secondary air will flow at a higher engine speed region, as shown by the broken line. However, the overall amount of the secondary air of this conduit is not adequate. In another conventional supply conduit having a greater length, the flow rate of the secondary air suddenly drops as the engine speed exceeds about 2000 rpm, as shown by the solid line. To the contrary, as shown by the chain line, the supply conduit according to the present invention does not undergo a sudden drop in the flow rate when the engine speed increases and is capable of supplying an increased amount of secondary air throughout a wider range of engine speeds.

Although the present invention has been described with reference to the specific embodiment thereof, it should be understood that the invention is not limited thereby and various changes and modifications may be made therein. For example, in the illustrated embodiment, the secondary air supply conduit 4 has been described as having a two-step structure including a larger diameter section 4a and a smaller diameter section 4b. However, the supply conduit may be made to have a stepped structure having two, three or more steps or may be tapered, provided that the flow area at the juncture with the exhaust pipe 2 is greater than the flow area at the inlet end.

What is claimed is:

1. A secondary air supply device for introducing fresh air into exhaust gas flowing through an exhaust pipe of an internal combustion engine in response to pressure pulsations of the exhaust gas, which comprises:

a secondary air supply conduit having first and second ends, said second end being adapted to be connected to the exhaust pipe; and a check valve mounted at said first end of said secondary air supply conduit for preventing backflow of the exhaust gas out of said first end due to pressure pulsations of the exhaust gas;

said secondary air supply conduit having at said second end a flow cross-sectional area larger than the flow area at said first end, wherein said secondary air supply conduit comprises a stepped tube including at the side of said first end a first section of reduced flow cross-sectional area and at the opposite side a second section of enlarged flow cross-sectional area, and wherein the length of said second section is roughly one-half of the total length of said secondary air supply conduit.

* * * * *